United States Patent
Kubo et al.

(10) Patent No.: US 11,329,320 B2
(45) Date of Patent: May 10, 2022

(54) NON-AQUEOUS ELECTROLYTE FOR LITHIUM AIR BATTERIES, AND LITHIUM AIR BATTERY USING THE SAME

(71) Applicant: NATIONAL INSTITUTE FOR MATERIALS SCIENCE, Tsukuba (JP)

(72) Inventors: Yoshimi Kubo, Tsukuba (JP); Xing Xin, Tsukuba (JP); Kimihiko Ito, Tsukuba (JP)

(73) Assignee: NATIONAL INSTITUTE FOR MATERIALS SCIENCE, Tsukuba (JP)

( * ) Notice: Subject to any disclaimer, the term of this patent is extended or adjusted under 35 U.S.C. 154(b) by 288 days.

(21) Appl. No.: 16/604,237

(22) PCT Filed: May 7, 2018

(86) PCT No.: PCT/JP2018/017608
§ 371 (c)(1),
(2) Date: Oct. 10, 2019

(87) PCT Pub. No.: WO2018/225434
PCT Pub. Date: Dec. 13, 2018

(65) Prior Publication Data
US 2020/0161709 A1 May 21, 2020

(30) Foreign Application Priority Data

Jun. 8, 2017 (JP) .............................. JP2017-113802

(51) Int. Cl.
*H01M 4/00* (2006.01)
*H01M 10/0569* (2010.01)
(Continued)

(52) U.S. Cl.
CPC ....... *H01M 10/0569* (2013.01); *H01M 4/134* (2013.01); *H01M 10/052* (2013.01);
(Continued)

(58) Field of Classification Search
CPC ......... H01M 12/08; H01M 2300/0062; H01M 4/382; H01M 2004/028; H01M 2300/0045; H01M 10/0569
See application file for complete search history.

(56) References Cited

U.S. PATENT DOCUMENTS

| | | | | |
|---|---|---|---|---|
| 2011/0143218 A1* | 6/2011 | Issaev | ................... | H01M 4/382 429/333 |
| 2013/0122373 A1* | 5/2013 | Tamura | ............. | H01M 10/0525 429/221 |

(Continued)

FOREIGN PATENT DOCUMENTS

| | | |
|---|---|---|
| EP | 2709194 A1 | 3/2014 |
| JP | 2005-197175 A | 7/2005 |

(Continued)

OTHER PUBLICATIONS

PCT/ISA/210, "International Search Report for International Application No. PCT/JP2018/017608," dated Jun. 26, 2018.

(Continued)

*Primary Examiner* — Cynthia H Kelly
*Assistant Examiner* — Monique M Wills
(74) *Attorney, Agent, or Firm* — Manabu Kanesaka (57) ABSTRACT

The present invention has for its object to provide a non-aqueous electrolyte for lithium air batteries capable of simultaneously holding back positive electrode overvoltage, reactions of the negative electrode with the electrolyte and dendrite growth during charging thereby making an improvement in the output performance, and a lithium air battery using the same. The invention provides a non-aqueous electrolyte for lithium air batteries, containing an organic solvent and a lithium salt. The lithium salt contains at least LiX (where X stands for Br and/or I) and lithium nitrate. The molar concentration (mol/L) of LiX in the non-aqueous electrolyte satisfies a range of no less than (Continued)

0.005 to no greater than 2.0, and the molar concentration (mol/L) of the lithium nitrate in the non-aqueous electrolyte satisfies a range of greater than 0.1 to no greater than 2.0.

15 Claims, 7 Drawing Sheets (51) Int. Cl.
$H01M\ 4/134$ (2010.01)
$H01M\ 10/052$ (2010.01)
$H01M\ 12/08$ (2006.01)
$H01M\ 4/02$ (2006.01)

(52) U.S. Cl.
CPC ...... $H01M\ 12/08$ (2013.01); $H01M\ 2004/027$ (2013.01); $H01M\ 2004/028$ (2013.01); $H01M\ 2300/0045$ (2013.01); $H01M\ 2300/0054$ (2013.01); $H01M\ 2300/0062$ (2013.01)

(56) References Cited

U.S. PATENT DOCUMENTS

2013/0130131 A1* 5/2013 Johnson ............ H01M 10/0565
429/403
2014/0079989 A1 3/2014 Janakiraman et al.
2016/0172711 A1* 6/2016 Yang .................... H01M 4/134
429/332

FOREIGN PATENT DOCUMENTS

KR 20160050222 A 5/2016
KR 20160147302 A 12/2016

OTHER PUBLICATIONS

Nasybulin, E. et al., "Effects of Electrolyte Salts on the Performance of Li—O_2_ Batteries," The Journal of Physical Chemistry, Jan. 21, 2013, p. 2635-2645, vol. 117, ACS Publications.

Giordani, V. et al., "Synergistic Effect of Oxygen and LiNO_3_ on the Interfacial Stability of Lithium Metal in a Li/O_2_ Battery," Journal of the Electrochemical Society, 2013, p. A1544-A1550, vol. 160, No. 9, The Electrochemical Society.

Uddin, J. et al., "Lithium Nitrate As Regenerable SEI Stabilizing Agent for Rechargeable Li/O_2_ Batteries," The Journal of Physical Chemistry Letters, Oct. 21, 2013, p. 3760-3765, vol. 4, ACS Publications.

Europe Patent Office, "Search Report for European Patent Publication No. 18813033.0," dated Feb. 18, 2021.

* cited by examiner

0.05M LiBr + 1 M LiNO$_3$/TEGDME

NON-AQUEOUS ELECTROLYTE FOR LITHIUM AIR BATTERIES, AND LITHIUM AIR BATTERY USING THE SAME

RELATED APPLICATIONS

The present application is National Phase of International Application No. PCT/JP2018/017608 filed May 7, 2018, and claims priority from Japanese Application No. 2017-113802, filed Jun. 8, 2017, the disclosure of which is hereby incorporated by reference herein in its entirety.

FIELD OF THE INVENTION

The present invention relates to a non-aqueous electrolyte for lithium air batteries, and a lithium air battery using the same.

BACKGROUND ART

An air battery includes a solid positive electrode material (air electrode), a negative electrode material comprising a metal foil or fine metallic particles, and a liquid or solid electrolyte, wherein air or oxygen gas flowing through a gas flow passage provided in the air battery is used as a positive electrode active substance, and the metal foil or fine metallic particles are used as a negative electrode active substance.

A plurality of air battery technologies have been put forward in the art, and research and development of lithium air batteries in particular have recently being stepping up. The reason is that the lithium air battery is not only formed into a rechargeable, repeatedly usable secondary battery, but is also much improved over a currently available lithium ion battery in terms of energy density per unit weight.

Referring to the lithium air battery, lithium ions in the electrolyte react with oxygen during discharging into lithium peroxide that is in turn broken down during charging into lithium ions and oxygen. A problem with the lithium air battery is, however, that oxygen generation overvoltage (positive electrode overvoltage) rises during charging, giving rise to decomposition of the electrolyte, corrosion of the air electrode, and so on. On the other hand, it has been known that the overvoltage is lowered by using LiBr for the electrolyte (for instance, see Non-Patent Publication 1). According to Non-Patent Publication 1, LiBr is thought of as a redox mediator having an effect on a lowering of the positive electrode overvoltage.

It has also been known that the lithium metal forming part of the negative electrode is so active that it reacts with most organic electrolytes. On the other hand, it has been reported that use of lithium nitrate in the electrolyte holds back reactions of the negative electrode with the electrolyte (for instance, see Non-Patent Publication 2). According to Non-Patent Publication 2, this would be because the lithium nitrate forms an oxide film on the surface of the lithium metal forming part of the negative electrode thereby holding back reactions of the lithium metal with the electrolyte.

Further, lithium ions are precipitated and dissolved at the negative electrode in association with charging and discharging; it is then known that at the lithium metal forming part of the negative electrode, localized precipitation of lithium ions takes place, resulting in dendrite growth, formation of an indent by local dissolution of lithium, and so on.

It is thus desired to develop a non-aqueous electrolyte for lithium air batteries that is capable of simultaneously holding back positive electrode overvoltage, reactions of the negative electrode with the electrolyte, and dendrite growth at the negative electrode during charging thereby making improvements in the output performance of the lithium air battery.

PRIOR ARTS

Non-Patent Publications

Non-Patent Publication 1: E. Nasybulin et al., J. Phys. Chem. C 2013, 117, 2635-2645
Non-Patent Publication 2: V. Giordani et al., J. Electrochem. Soc., 2013, 160(9), A1544-A1550

SUMMARY OF THE INVENTION

Objects of the Invention

An object of the present invention is to provide a non-aqueous electrolyte for lithium air batteries that is capable of simultaneously holding back positive electrode overvoltage, reactions of the negative electrode with the electrolyte, and dendrite growth at the negative electrode during charging thereby making improvements in the output performance of a lithium air battery, and a lithium air battery using the same.

Embodiments of the Invention

According to one embodiment of the invention, there is a non-aqueous electrolyte for lithium air batteries provided, which contains an organic solvent and a lithium salt, wherein the lithium salt contains at least LiX (where X stands for Br and/or I) and lithium nitrate, a molar concentration (mol/L) of the LiX in the non-aqueous electrolyte satisfies a range of no less than 0.005 to no greater than 2.0, and a molar concentration (mol/L) of the lithium nitrate in the non-aqueous electrolyte satisfies a range of greater than 0.1 to no greater than 2.0 thereby achieving the aforesaid objects.

The molar concentration (mol/L) of the LiX in the non-aqueous electrolyte may satisfy a range of no less than 0.01 to no greater than 1.0, and the molar concentration (mol/L) of the lithium nitrate in the non-aqueous electrolyte may satisfy a range of no less than 0.2 to no greater than 1.0.

The molar concentration (mol/L) of the LiX in the non-aqueous electrolyte may satisfy a range of no less than 0.02 to no greater than 0.5, and the molar concentration (mol/L) of the lithium nitrate in the non-aqueous electrolyte may satisfy a range of no less than 0.3 to no greater than 1.0.

The molar ratio of the LiX with respect to the lithium nitrate (LiX/lithium nitrate) may be in a range of no less than 0.01 to no greater than 5.

The molar ratio of the LiX with respect to the lithium nitrate (LiX/lithium nitrate) may be in a range of no less than 0.01 to no greater than 1.

The molar ratio of the LiX with respect to the lithium nitrate (LiX/lithium nitrate) may be in a range of no less than 0.05 to no greater than 0.5.

The molar ratio of the LiX with respect to the lithium nitrate (LiX/lithium nitrate) may be in a range of no less than 0.05 to no greater than 0.2.

The total molar concentration (mol/L) of the LiX and lithium nitrate in the non-aqueous electrolyte may satisfy a range of no less than 0.3 to no greater than 2.0.

The total molar concentration (mol/L) of the LiX and lithium nitrate in the non-aqueous electrolyte may satisfy a range of no less than 0.35 to no greater than 1.05.

The organic solvent may be selected from the group consisting of a glyme, methyl butyl ether, diethyl ether, ethyl butyl ether, dibutyl ether, polyethylene glycol dimethyl ether, tetraethylene glycol dimethyl ether, cyclohexanone, dioxane, dimethoxyethane, 2-methyltetrahydrofuran, 2,2-dimethyltetrahydrofuran, 2,5-dimethyltetrahydrofuran, tetrahydrofuran, methyl acetate, ethyl acetate, n-propyl acetate, dimethyl acetate, methyl propionate, ethyl propionate, methyl formate, ethyl formate, dimethyl carbonate, diethyl carbonate, ethyl methyl carbonate, dipropyl carbonate, methyl propyl carbonate, ethyl propyl carbonate, ethylene carbonate, propylene carbonate, butylene carbonate, polyethylene carbonate, γ-butyrolactone, decanolide, valerolactone, mevalonolactone, caprolactone, acetonitrile, benzonitrile, nitromethane, nitrobenzene, triethylamine, triphenylamine, tetraethylene glycol diamine, dimethylformamide, diethylformamide, N-methylpyrrolidone, dimethyl sulfone, tetramethylene sulfone, triethylphosphine oxide, 1,3-dioxolane and sulfolane.

The glyme may be selected from the group consisting of monoglyme, diglyme, triglyme and tetraglyme.

The non-aqueous electrolyte may further contain a lithium salt selected from the group consisting of $LiPF_6$, $LiBF_4$, $LiSbF_6$, $LiSiF_6$, $LiAsF_6$, $LiN(SO_2C_2F_5)_2$, $Li(FSO_2)_2N$, $Li(CF_3SO_2)_2N$ (also called LiTFSI), $LiCF_3SO_3$ (also called LiTfO), $LiC_4F_9SO_3$, $LiClO_4$, $LiAlO_2$, $LiAlCl_4$ and $LiB(C_2O_4)_2$.

In this case, the total molar concentration (mol/L) of the LiX, the lithium nitrate and the aforesaid further lithium salt in the non-aqueous electrolyte may satisfy a range of no less than 0.35 to no greater than 3.0.

The total molar concentration (mol/L) of the LiX, the lithium nitrate and the aforesaid further lithium salt in the non-aqueous electrolyte may satisfy a range of no less than 1.0 to no greater than 2.1.

The lithium air battery of the invention comprises an air electrode, a negative electrode containing a lithium metal, and a non-aqueous electrolyte interposed between the air electrode and the negative electrode, wherein such a non-aqueous electrolyte as described above is used as the non-aqueous electrolyte thereby achieving the aforesaid objects.

Advantages of the Invention

The non-aqueous electrolyte for lithium air batteries according to the invention contains an organic solvent and at least LiX (where X stands for Br and/or I) and lithium nitrate as a lithium salt. LiX allows for a lowering of positive electrode overvoltage, and holds back decomposition of the electrolyte and corrosion of the air electrode. Lithium nitrate permits an oxide film ($Li_2O$) of the lithium metal to be formed on the lithium metal-containing negative electrode for protection of the surface of the negative electrode. In addition, because the molar concentration (mol/L) of LiX in the non-aqueous electrolyte satisfies the range of no less than 0.005 to no greater than 2.0 and the molar concentration (mol/L) of lithium nitrate in the non-aqueous electrolyte satisfies the range of no less than 0.1 to no greater than 2.0 with simultaneous incorporation of LiX and lithium nitrate, the reaction of decomposing the oxide film ($Li_2O$) of the lithium metal and the reaction of forming the oxide film ($Li_2O$) of the lithium metal due to $NO_3^-$ based on lithium nitrate take place at the same time in the lithium metal-containing negative electrode of the lithium air battery so that the surface of the negative electrode can constantly be protected by a thin oxide film. This in turn results in no abnormal growth such as dendrite growth that is otherwise caused by the unevenness of the oxide film, and keeps any electric resistance from increasing due to an increase in the thickness of the oxide film. In addition, the oxide film holds back the reaction of the lithium metal forming part of the negative electrode with the non-aqueous electrolyte, and functions as an SEI (solid electrolyte interphase) layer having some constant ion conductivity, ending up with an improvement in the output performance of the lithium air battery.

MODES FOR CARRYING OUT THE INVENTION

Some modes for carrying out the invention will now be explained with reference to the accompanying drawings. Note here that like elements are indicated by like numerals: they will not be explained any more.

Mode 1

The non-aqueous electrolyte for lithium air batteries according to the invention and how to produce the same are explained with reference to Mode 1.

The non-aqueous electrolyte for lithium air batteries according to the invention contains an organic solvent and at least LiX (where X stands for Br and/or I) and lithium nitrate as a lithium salt. Further, the molar concentration (mol/L) of LiX in the non-aqueous electrolyte satisfies a range of no less than 0.005 to no greater than 2.0, and the molar concentration (mol/L) of the lithium nitrate in the non-aqueous electrolyte satisfies a range of greater than 0.1 to no greater than 2.0. According to the invention wherein the non-aqueous electrolyte contains two salts: LiX and lithium nitrate in the aforesaid concentration ranges at the same time, the aforesaid advantages are achievable, as will be described in greater details.

A lithium air battery comprising an air electrode, a lithium metal-containing negative electrode and a non-aqueous electrolyte interposed between them utilizes oxygen in air for electrochemical reactions, and such charge-discharge reactions as given below proceed, as known in the art.

During Discharging

At the negative electrode, the reaction $Li \rightarrow Li^+ + e^-$ takes place.

At the air electrode, the reaction $2Li^+ + O_2 + 2e^- \rightarrow Li_2O_2$ takes place.

During Charging

At the negative electrode, the reaction $Li^+ + e^- \rightarrow Li$ takes place.

At the air electrode, the reaction $Li_2O_2 \rightarrow 2Li^+ + O_2 + 2e^-$ takes place.

It is thus found that the lithium air battery generates lithium peroxide ($Li_2O_2$) during discharging, and the lithium peroxide is electrochemically oxidized and broken down during charging.

The non-aqueous electrolyte of the invention contains lithium nitrate ($LiNO_3$), and the lithium nitrate forms a lithium oxide ($Li_2O$) film on the surface of the lithium metal-containing negative electrode according to the following formula (the reaction of forming an oxide film of the lithium metal).

$$NO_3^- + 2Li \rightarrow NO_2^- + Li_2O \quad (1)$$

In the lithium air battery in particular, nitrite ions ($NO_2^-$) formed according to formula (1) are oxidized according to the following formula in the presence of oxygen, and again circulated in the form of nitrate ions ($NO_3^-$), keeping the effect on oxide film formation.

$$NO_2^- + (\tfrac{1}{2})O_2 \rightarrow NO_3^-$$

The formation of the oxide film allows for protection of the surface of the lithium metal-containing negative electrode, and offers an advantage in that the reaction between the lithium metal and the non-aqueous electrolyte is held back.

As mentioned above, the non-aqueous electrolyte of the invention contains LiX (where X stands for Br and/or I), and the redox potentials of $Br^-/Br_3^-$ and $I^-/I_3^-$ are as low as about 3.5V and about 2.9V, respectively, with the result that $Br^-$ and $I^-$ are respectively electrochemically oxidized into $Br_3^-$ and $I_3^-$ with ease. The oxidized $Br_3^-$ and $I_3^-$ cause the lithium peroxide that is a discharge product to be oxidized and decomposed for reduction into Br– and I– according to the following formula.

$$X_3^- + Li_2O_2 \rightarrow 2Li^+ + O_2 + 3X^- \quad (2)$$

where X stands for Br and/or I.

Thus, the presence of LiX ensures that the charging voltage goes down to near the redox voltage, promoting the charging reaction. Note here that with lithium chloride or lithium fluoride, the aforesaid advantages are not expectable because such redox reactions do not take place.

Further, a large part of the oxidized $X_3^-$ is used for the reaction represented by the aforesaid formula (2), but the remaining part is dispersed over the lithium metal-containing negative electrode to decompose the oxide film (the reaction of decomposing the lithium metal oxide film) according to the following formula.

$$X_3^- + Li_2O \rightarrow 2Li^+ + (\tfrac{1}{2})O_2 + 3X^- \quad (3)$$

As described above, the non-aqueous electrolyte of the invention contains LiX and lithium nitrate thereby allowing for the aforesaid reactions (1), (2) and (3) to take place at the same time, and the aforesaid reaction (2) allows for a lowering of positive electrode overvoltage and holds back decomposition of the electrolyte and corrosion of the air electrode.

By letting the molar concentration (mol/L) of LiX in the non-aqueous electrolyte satisfy the range of no less than 0.005 to no greater than 2.0 and the molar concentration (mol/L) of lithium nitrate in the non-aqueous electrolyte satisfy the range of greater than 0.1 to no greater than 2.0, it has further surprisingly been found that the aforesaid reaction (1) so competes with the aforesaid reaction (3) that the reaction of decomposing the $Li_2O$ oxide film and the reaction of forming the $Li_2O$ oxide film take place at the same time, leading constantly to protection of the surface of the negative electrode with the thin oxide film ($Li_2O$) having a thickness of several tens nm at most. Consequently, it is possible to hold back abnormal growth such as dendrite growth on the surface of the negative electrode while holding back any increase in the electrical resistance due to an increasing film thickness caused when only the reaction (1) occurs. In addition, $Li_2O$ acts to hold back the reaction between the lithium metal of the negative electrode with the non-aqueous electrolyte, and functions as the SEI layer having some constant ion conductivity, resulting in improvements in the output performance of the lithium air battery.

It is here noted that when the molar concentration of LiX is less than 0.005 moles, the amount of LiX is so small that the aforesaid reactions (2) and (3) lose effect. Although the molar concentration of LiX may exceed 2.0 moles, its dissolution in the organic solvent may have much difficulty. When the molar concentration of lithium nitrate is not greater than 0.1 mole, the aforesaid reaction (1) is unexpected with the result that any intentional competing of the reaction (1) with the reaction (3) is not maintained. Although the molar concentration of lithium nitrate may exceed 2.0 moles, its dissolution in the organic solvent may have much difficulty.

The molar concentration (mol/L) of LiX in the non-aqueous electrolyte satisfies a range of preferably no less than 0.01 to no greater than 1.0, and the molar concentration (mol/L) of lithium nitrate in the non-aqueous electrolyte satisfies a range of preferably no less than 0.2 to no greater than 1.0 for the purpose of achieving a lowering of positive electrode overvoltage and holding back abnormal growth such as dendrite growth at the negative electrode.

The molar concentration (mol/L) of LiX in the non-aqueous electrolyte satisfies a range of more preferably no less than 0.02 to no greater than 0.5, and the molar concentration (mol/L) of lithium nitrate in the non-aqueous electrolyte satisfies a range of more preferably no less than 0.3 to no greater than 1.0 for the purpose of achieving a further lowering of positive electrode overvoltage and further holding back abnormal growth such as dendrite growth at the negative electrode.

In the non-aqueous electrolyte of the invention, the molar ratio of LiX to lithium nitrate (LiX/lithium nitrate molar ratio) is in a range of preferably no less than 0.01 to no greater than 5 for the purpose of achieving a lowering of positive electrode overvoltage and holding back abnormal growth such as dendrite growth at the negative electrode.

In the non-aqueous electrolyte of the invention, the molar ratio of LiX to lithium nitrate (LiX/lithium nitrate molar ratio) is in a range of more preferably no less than 0.01 to no greater than 1 for the purpose of achieving a further lowering of positive electrode overvoltage and further holding back abnormal growth such as dendrite growth at the negative electrode.

In the non-aqueous electrolyte of the invention, the molar ratio of LiX to lithium nitrate (LiX/lithium nitrate molar ratio) is in a range of even more preferably no less than 0.05 to no greater than 0.5 for the purpose of achieving a much more lowering of positive electrode overvoltage and even further holding back abnormal growth such as dendrite growth at the negative electrode.

In the non-aqueous electrolyte of the invention, the molar ratio of LiX to lithium nitrate (LiX/lithium nitrate molar ratio) is in a range of most preferably no less than 0.05 to no greater than 0.2 for the purpose of achieving a much more lowering of positive electrode overvoltage and remarkably holding back abnormal growth such as dendrite growth at the negative electrode.

In the non-aqueous electrolyte of the invention, the total molar concentration (mol/L) of LiX and lithium nitrate satisfies a range of preferably no less than 0.3 to no greater than 2.0. If this range is satisfied, the positive electrode overvoltage is lowered and abnormal growth such as dendrite growth at the negative electrode is further held back.

In the non-aqueous electrolyte of the invention, the total molar concentration (mol/L) of LiX and lithium nitrate satisfies a range of more preferably no less than 0.35 to no greater than 1.05. If this range is satisfied, the positive electrode overvoltage is much more lowered and abnormal growth such as dendrite growth at the negative electrode is much more held back.

In the non-aqueous electrolyte of the invention, although there is no particular limitation imposed on the organic solvent provided that it may be used in a non-aqueous electrolyte for air batteries, it is preferable to use an organic solvent selected from the group consisting of a glyme, methyl butyl ether, diethyl ether, ethyl butyl ether, dibutyl ether, polyethylene glycol dimethyl ether, tetraethylene glycol dimethyl ether, cyclohexanone, dioxane, dimethoxyethane, 2-methyltetrahydrofuran, 2,2-dimethyltetrahydrofuran, 2,5-dimethyltetrahydrofuran, tetrahydrofuran, methyl acetate, ethyl acetate, n-propyl acetate, dimethyl acetate, methyl propionate, ethyl propionate, methyl formate, ethyl formate, dimethyl carbonate, diethyl carbonate, ethyl methyl carbonate, dipropyl carbonate, methyl propyl carbonate, ethyl propyl carbonate, ethylene carbonate, propylene carbonate, butylene carbonate, polyethylene carbonate, γ-butyrolactone, decanolide, valerolactone, mevalonolactone, caprolactone, acetonitrile, benzonitrile, nitromethane, nitrobenzene, triethylamine, triphenylamine, tetraethylene glycol diamine, dimethylformamide, diethylformamide, N-methylpyrrolidone, dimethyl sulfone, tetramethylene sulfone, triethylphosphine oxide, 1,3-dioxolane and sulfolane. These organic solvents are preferred because of being capable of dissolving LiX and lithium nitrate.

More preferably, the organic solvent is a glyme selected from the group consisting of monoglyme, diglyme, triglyme and tetraglyme. These glymes could dissolve LiX and lithium nitrate, and ensure that when the non-aqueous electrolyte is in the form of an ion liquid consisting substantially of ions alone, it has properties such as flame retardance, less volatility and high ion conductivity and is able to improve the output performance of the air battery.

Preferably, the non-aqueous electrolyte of the invention may further contain a lithium salt selected from the group consisting of $LiPF_6$, $LiBF_4$, $LiSbF_6$, $LiSiF_6$, $LiAsF_6$, $LiN(SO_2C_2F_5)_2$, $Li(FSO_2)_2N$, $Li(CF_3SO_2)_2N$ (also called LiTFSI), $LiCF_3SO_3$ (also called LiTfO), $LiC_4F_9SO_3$, $LiClO_4$, $LiAlO_2$, $LiAlCl_4$ and $LiB(C_2O_4)_2$. These lithium salts, because of being easily dissolved in the aforesaid organic solvent and having a wide potential window, contribute more to improvements in the output performance when used in combination with the aforesaid LiX and lithium nitrate.

When the non-aqueous electrolyte of the invention contains the further lithium salt, it is added to the non-aqueous electrolyte such that the total molar concentration (mol/L) of LiX, lithium nitrate and the further lithium salt satisfies a range of preferably no less than 0.35 to no greater than 3.0, and more preferably no less than 1.0 to no greater than 2.1. If such ranges are satisfied, the non-aqueous electrolyte will contain lithium ions having enhanced electrical conductivity, and be expected to cause a lowering of positive electrode overvoltage and hold back abnormal growth such as dendrite growth at the negative electrode, leading to further improvements in the output performance of the lithium air battery.

By way of example but not by way of limitation, the non-aqueous electrolyte of the invention may be produced as follows.

LiX and lithium nitrate may be added to and stirred with the aforesaid organic solvent. Although stirring or agitation may manually be carried out, it is preferable to rely upon a stirring or agitating apparatus such as a stirrer or a propeller for making sure dissolution. Note here that LiX and lithium nitrate are added in such a way as to have a molar concentration (mol/L) of no less than 0.005 to no greater than 2.0 and greater than 0.1 to no greater than 2.0, respectively, in the non-aqueous electrolyte, providing a non-aqueous electrolyte having the aforesaid advantages.

LiX and lithium nitrate are added in such a way as to have a molar concentration (mol/L) of preferably no less than 0.01 to no greater than 1.0 and no less than 0.2 to no greater than 1.0, and more preferably no less than 0.02 to no greater than 0.5 and no less than 0.3 to no greater than 1.0, respectively, in the non-aqueous electrolyte.

In that case, LiX and lithium nitrate may be added such that the molar ratio of LiX to lithium nitrate (LiX/lithium nitrate molar ratio) satisfies a range of preferably no less than 0.01 to no greater than 5, more preferably no less than 0.01 to no greater than 1, even more preferably no less than 0.05 to no greater than 0.5, and most preferably no less than 0.05 to no greater than 0.2.

If required, the aforesaid further lithium salt may be added and stirred. In this case, the further lithium salt may be added such that the total molar concentration (mol/L) of the aforesaid LiX, lithium nitrate and further lithium salt satisfies a range of preferably no less than 0.35 to no greater than 3.0, and more preferably no less than 1.0 to no greater than 2.1.

Thus, the non-aqueous electrolyte of the invention is produced by simple stirring without reliance on any special apparatus and technology; hence, it offers an advantage in terms of practical use.

Mode 2

In Mode 2, a lithium air battery formed of the non-aqueous electrolyte of the invention explained with reference to Mode 1 will be described.

Figure 1:
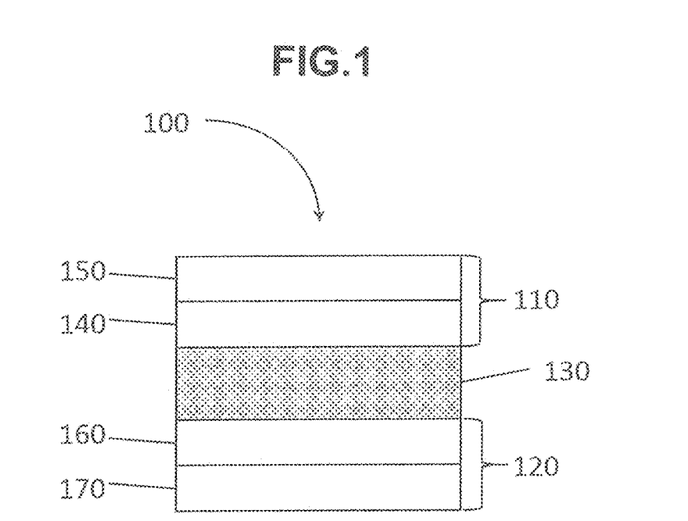
FIG. 1 is a schematic view of a lithium air battery using the non-aqueous electrolyte of the invention.

FIG. 1 is a schematic view of the lithium air battery assembled using the non-aqueous electrolyte of the invention.

A lithium air battery 100 according to the invention comprises an air electrode 110, a negative electrode 120 containing a lithium metal, and a non-aqueous electrolyte 130 interposed between the air electrode 110 and the negative electrode 120. Note here that being the non-aqueous electrolyte explained with reference to Mode 1, the non-aqueous electrolyte 130 will not be explained anymore.

The air electrode 110 comprises a positive electrode reaction layer 140 and a positive electrode collector 150 contiguous thereto. Although the positive electrode reaction layer 140 is composed mainly of a porous carbon material, it may include a catalyst, a binder, an electrically conductive assistant, and so on. By way of example, the porous carbon material includes mesoporous carbon, graphene, carbon black, acetylene black, carbon nanotube, carbon nanofiber, and carbon nanohorn. The positive electrode collector 150 is formed of a metal material or carbon having porosity and electrical conductivity, and may have a terminal (not shown) connected to the outside.

The negative electrode 120 comprises a negative electrode active substance layer 160 containing a lithium metal and a negative electrode collector 170 contiguous to the negative electrode active substance layer 160. The lithium metal contained in the negative electrode active substance layer 160 may be either a single lithium metal or a lithium alloy. By way of example but not by way of limitation, the element that forms a lithium alloy with lithium may include magnesium, titanium, tin, lead, aluminum, indium, silicon, zinc, antimony, bismuth, gallium, germanium, and yttrium. The negative electrode collector 170 is formed of a metal material, carbon or the like having electrical conductivity, as is the case with the positive electrode collector, and may have a terminal (not shown) connected to the outside. For instance, the negative electrode active substance layer 160 may be made integral with the negative electrode collector 170.

While the lithium air battery of the invention operates on the same principles as is the case with an existing lithium air battery, it is understood that in the lithium air battery 100 of the invention, the non-aqueous electrolyte 130 explained with reference to Mode 1 is used so that the surface of the negative electrode active layer 160 is constantly covered with a thin oxide film ($Li_2O$). For this reason, even when the lithium air battery is repeatedly used, there is no abnormal growth such as dendrite growth generated on the surface of the negative electrode active substance layer 160, and any increase in the electrical resistance due to an increasing thickness of the oxide film is held back. To add to this, the oxide film holds back the reaction between the lithium metal of the negative electrode and the non-aqueous electrolyte to keep the electrolyte against decomposition, and functions as the SEI layer having some constant ion conductivity. Consequently, it is possible to make a remarkable improvement in the output performance of the lithium air battery 100.

It is noted that the lithium air battery 100 may be provided in the non-aqueous electrolyte 130 with a separator (not shown), and a plurality of lithium air batteries 100 may be stacked one upon another, as would be obvious to a skilled person in the art.

While the present invention is applied to a lithium air battery, it is understood that the non-aqueous electrolyte of the invention may be applied to the electrolyte of a lithium metal battery other than the air battery.

While the present invention will now be explained with reference to some specific examples, it is understood that the present invention is in no sense limited to these examples.

EXAMPLES

Materials

The materials used in the following examples and comparative examples are now explained. All the materials are of special grade chemical nature: they were all used without purification. Lithium bromide (LiBr) and lithium iodide (LiI) were purchased from Sigma-Aldrich; lithium nitrate from KISHIDA CHEMICAL Co., Ltd.; lithium trifluoromethane sulfonate ($LiCF_3SO_3$ or LiTfO) and lithium bis(trifluoromethanesulfonyl)imide ($LiN(SO_2CF_3)_2$ or LiTFSI) from KISHIDA CHEMICAL Co., Ltd.; and tetraethylene glycol dimethyl ether (tetraglyme or TEGDME) from Japan Advanced Chemicals.

Example 1

In Example 1, tetraglyme was used as the organic solvent, and the lithium salts: LiBr (0.05 mol/L) and lithium nitrate (1 mol/L) were dissolved in it to prepare a non-aqueous electrolyte that was then used for the preparation of a lithium air battery. In the following, "mol/L" will be called just "M" for the purpose of simplicity.

The non-aqueous electrolyte was prepared by a 10-hours stirring and dissolution by a stirrer of the tetraglyme solvent having the lithium salts added to it in the concentrations set forth in Table 1. Then, the obtained non-aqueous electrolyte was used for the production of a coin cell type lithium air battery.

Carbon black: Ketjenblack (registered trademark) was coated in an amount of 1 mg/cm$^2$ on a positive electrode collector (150 in FIG. 1) that was carbon paper (having a diameter of 16 mm and a thickness of 0.2 mm) to form a positive electrode reaction layer (140 in FIG. 1) thereby obtaining an air electrode (110 in FIG. 1).

A lithium foil (having a diameter of 16 mm and a thickness of 0.2 mm) was used as the lithium metal-containing negative electrode active substance layer (160 in FIG. 1) and negative electrode collector (170 in FIG. 1) to obtain a negative electrode (120 in FIG. 1).

In a dry room (dry air) having a dew point temperature of −50° C. or lower, the air electrode, negative electrode, separator formed of a polypropylene porous film, and non-aqueous electrolyte were encased in a coin cell case (of CR2032 type). Note here that prior to encasing, plural small air inlet/outlet openings (of 1 mm in diameter) were provided in the surface of the air electrode of the coin cell case.

Figure 2:
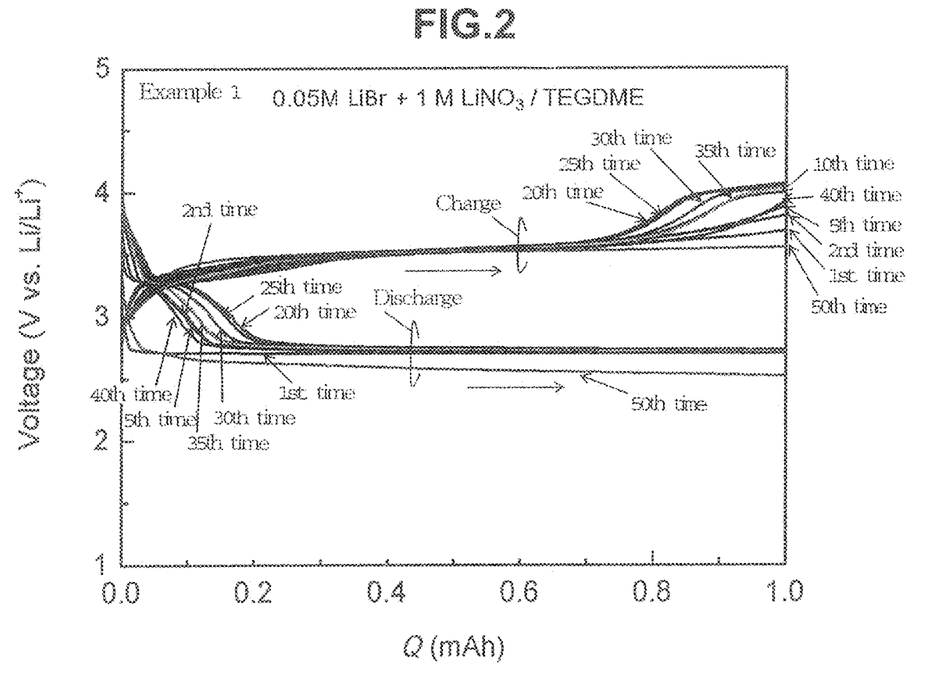
FIG. 2 is indicative of the charge-discharge cycle performance of the lithium air battery according to Example 1.
Figure 6:
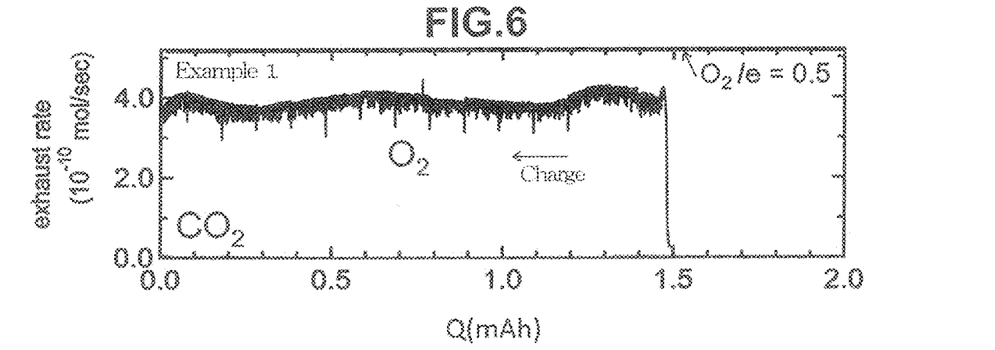
FIG. 6 is indicative of changes in the amount of oxygen generated out of the lithium air battery according to Example 1 during charging.

The thus assembled lithium air battery was estimated in terms of cycle performance. Specifically, a cycle comprising a 10-hours discharge and a 10-hours charge at a current value of 0.1 mA were repeated 50 times in the dry room. Used for measurements was a charge/discharge test machine HJ1001SD8 (HOKUTO DENKO CORPORATION). The results are shown in FIG. 2. Further, the amount of oxygen generated at the air electrode at the first cycle was measured by electrochemical mass spectrometry. The results are shown in FIG. 6. Post charge/discharge states of the negative electrode were observed under a scanning electron microscope (SEM: Model No. JSM-7800F made by JEOL Ltd.). The results are shown in FIG. 11.

Example 2

In Example 2, Example 1 was repeated with the exception that LiBr (0.05M) and lithium nitrate (0.5M) were dissolved as the lithium salt in the organic solvent to prepare a non-aqueous electrolyte that was then used to produce a lithium air battery. The cycle performance of the obtained lithium air battery was estimated, and states of the negative electrode were observed.

Example 3

In Example 3, Example 1 was repeated with the exception that LiBr (0.05M) and lithium nitrate (0.3M) were dissolved as the lithium salt in the organic solvent to prepare a non-aqueous electrolyte that was then used to produce a lithium air battery. The cycle performance of the obtained lithium air battery was estimated, and states of the negative electrode were observed.

Comparative Example 4

Figure 3:
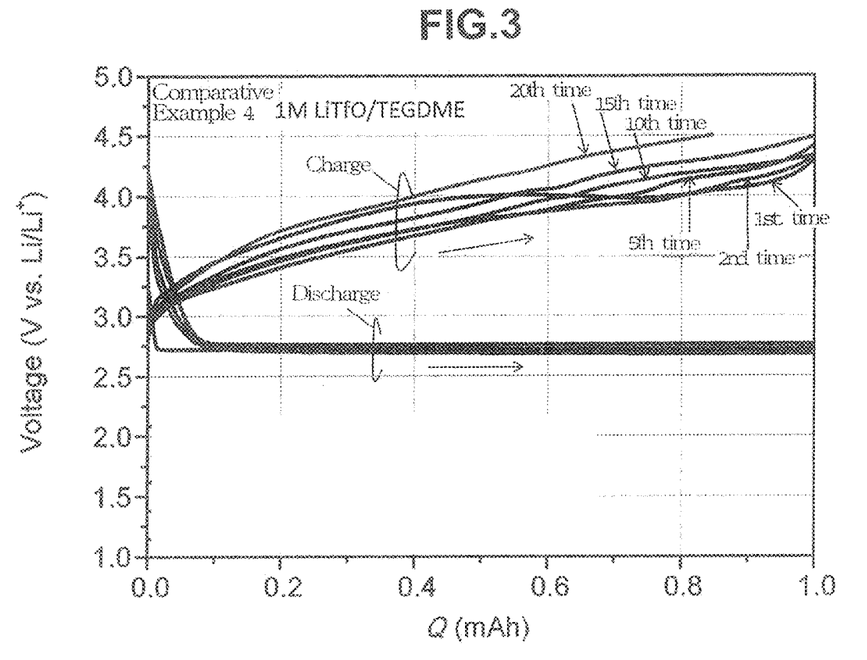
FIG. 3 is indicative of the charge-discharge cycle performance of the lithium air battery according to Comparative Example 4.
Figure 7:
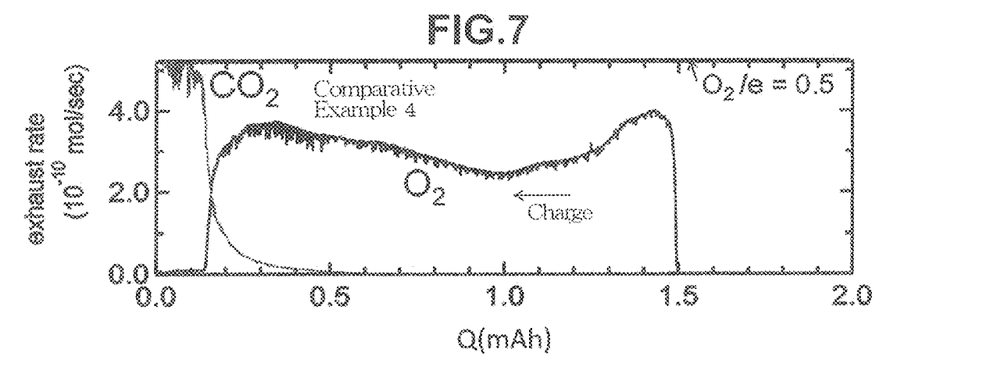
FIG. 7 is indicative of changes in the amount of oxygen generated out of the lithium air battery according to Comparative Example 4 during charging.

In Comparative Example 4, tetraglyme was used as the organic solvent in which LiTfO (1M) was dissolved as the lithium salt to prepare a non-aqueous electrolyte that was then used for the production of a lithium air battery. As in Example 1, the cycle performance of the lithium air battery (20 cycles) was estimated, and the amount of oxygen was measured. The results are shown in FIGS. 3 and 7. States of the negative electrode were also observed. The results are shown in FIG. 12.

Comparative Example 5

Figure 4:
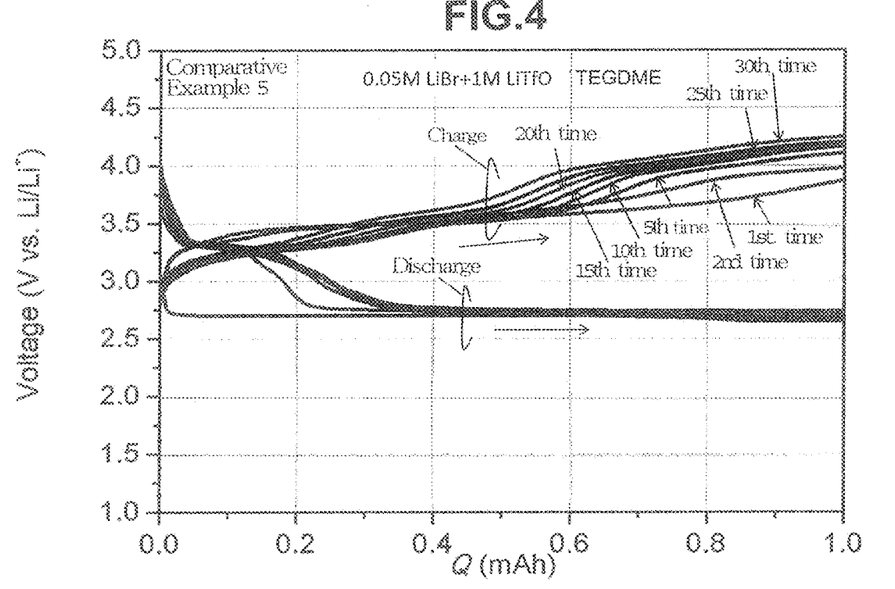
FIG. 4 is indicative of the charge-discharge cycle performance of the lithium air battery according to Comparative Example 5.
Figure 8:
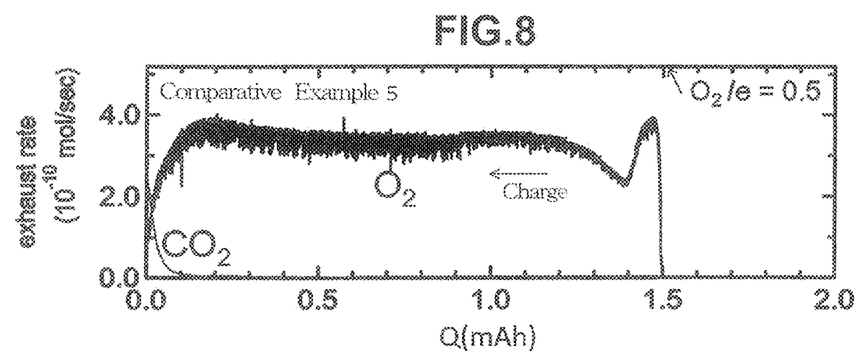
FIG. 8 is indicative of changes in the amount of oxygen generated out of the lithium air battery according to Comparative Example 5 during charging.

In Comparative Example 5, tetraglyme was used as the organic solvent in which LiBr (0.05M) and LiTfO (1M) were dissolved as the lithium salt to prepare a non-aqueous electrolyte that was then used for the production of a lithium air battery. As in Example 1, the cycle performance of the lithium air battery (30 cycles) was estimated, and the amount of oxygen was measured. The results are shown in FIGS. 4 and 8. States of the negative electrode were also observed.

Comparative Example 6

Figure 5:
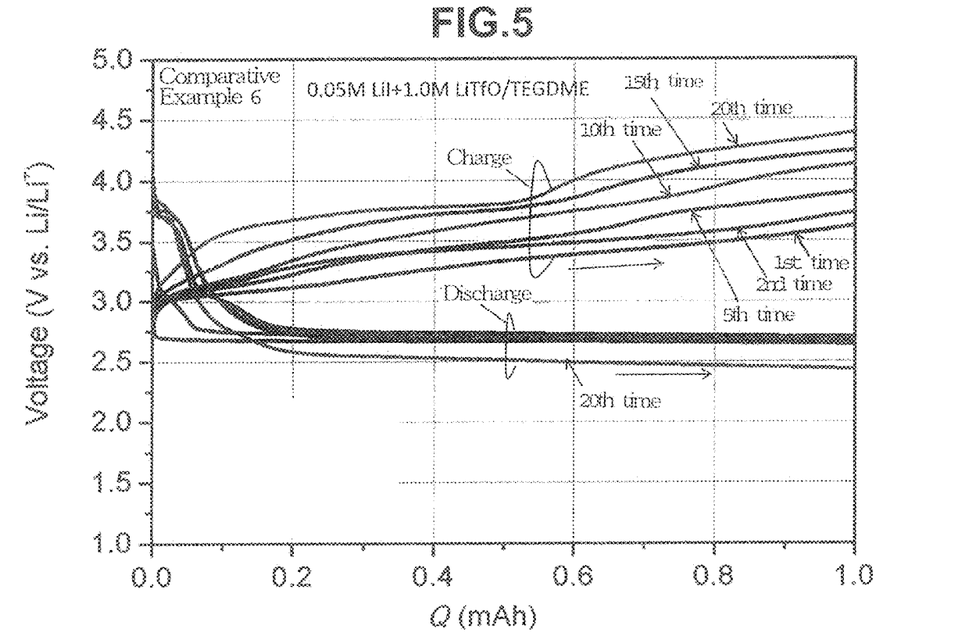
FIG. 5 is indicative of the charge-discharge cycle performance of the lithium air battery according to Comparative Example 6.
Figure 9:
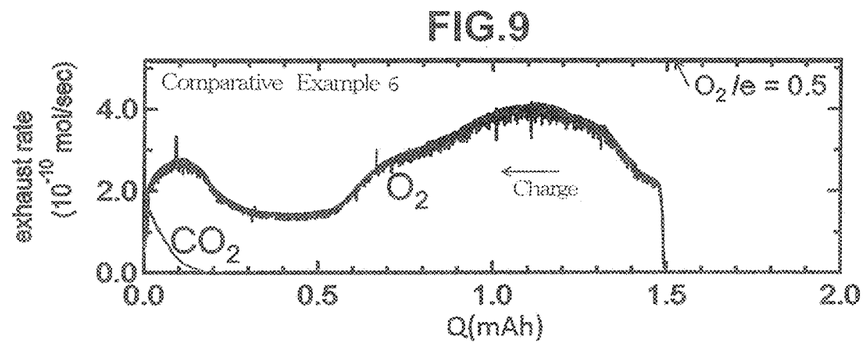
FIG. 9 is indicative of changes in the amount of oxygen generated out of the lithium air battery according to Comparative Example 6 during charging.

In Comparative Example 6, tetraglyme was used as the organic solvent in which LiI (0.05M) and LiTfO (1M) were dissolved as the lithium salt to prepare a non-aqueous electrolyte that was then used for the production of a lithium air battery. As in Example 1, the cycle performance of the lithium air battery (20 cycles) was estimated, and the amount of oxygen was measured. The results are shown in FIGS. 5 and 9. States of the negative electrode were also observed.

Comparative Example 7

Figure 10:
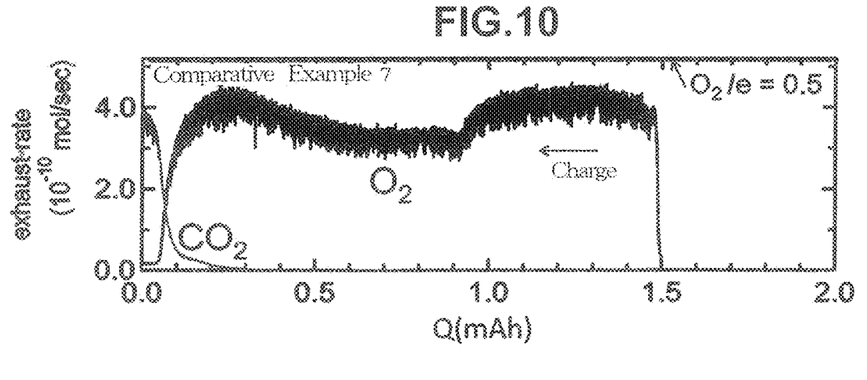
FIG. 10 is indicative of changes in the amount of oxygen generated out of the lithium air battery according to Comparative Example 7 during charging.
Figure 13A:
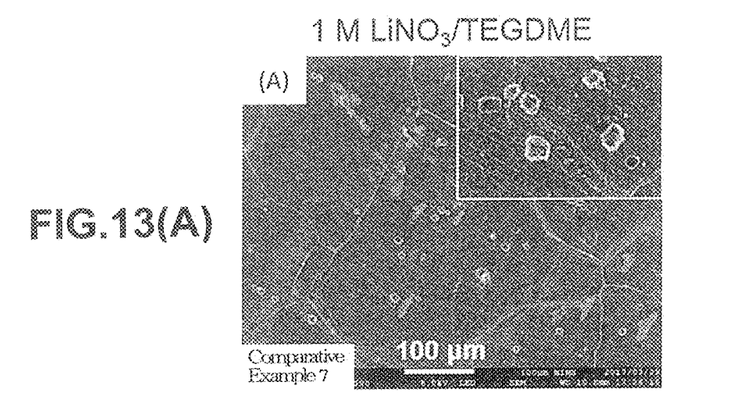
FIGS. 13(A), 13(B) and 13(C) are SEM images taken of a post charge-discharge state of the negative electrode of the lithium air battery according to Comparative Example 7.
Figure 13B:
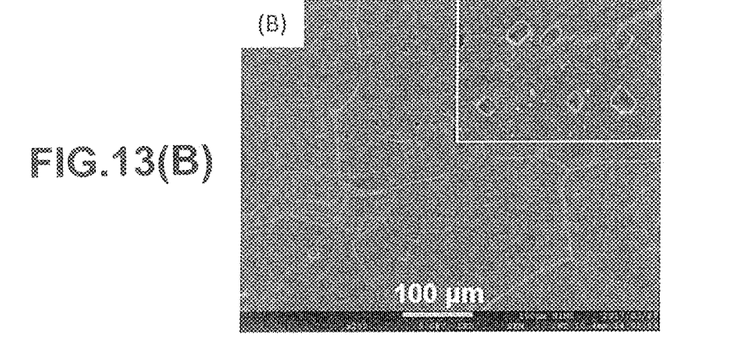
Figure 13C:
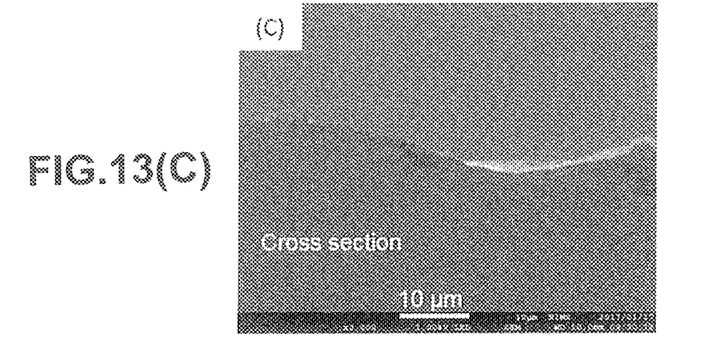

In Comparative Example 7, tetraglyme was used as the organic solvent in which lithium nitrate (1M) was dissolved as the lithium salt to prepare a non-aqueous electrolyte that was then used for the production of a lithium air battery. As in Example 1, the cycle performance of the lithium air battery (20 cycles) was estimated, and the amount of oxygen was measured. The results of measurement of the amount of oxygen are shown in FIG. 10. States of the negative electrode were also observed. The results are shown in FIG. 13.

Comparative Example 8

In Comparative Example 8, Example 1 was repeated with the exception that LiBr (0.05M) and lithium nitrate (0.1M) were dissolved as the lithium salt in the organic solvent to prepare a non-aqueous electrolyte that was then used to produce a lithium air battery. The cycle performance of the obtained lithium air battery was estimated, and states of the negative electrode were observed.

Example 9

In Example 9, Example 1 was repeated with the exception that LiBr (0.01M) and lithium nitrate (1.0M) were dissolved as the lithium salt in the organic solvent to prepare a non-aqueous electrolyte that was then used to produce a lithium air battery. The cycle performance of the obtained lithium air battery was estimated, and states of the negative electrode were observed.

Example 10

In Example 10, Example 1 was repeated with the exception that LiBr (0.1M) and lithium nitrate (1.0M) were dissolved as the lithium salt in the organic solvent to prepare a non-aqueous electrolyte that was then used to produce a lithium air battery. The cycle performance of the obtained lithium air battery was estimated, and states of the negative electrode were observed.

Example 11

In Example 11, Example 1 was repeated with the exception that LiBr (0.5M) and lithium nitrate (1.0M) were dissolved as the lithium salt in the organic solvent to prepare a non-aqueous electrolyte that was then used to produce a lithium air battery. The cycle performance of the obtained lithium air battery was estimated, and states of the negative electrode were observed.

Example 12

In Example 12, Example 1 was repeated with the exception that LiBr (1.0M) and lithium nitrate (1.0M) were dissolved as the lithium salt in the organic solvent to prepare a non-aqueous electrolyte that was then used to produce a lithium air battery. The cycle performance of the obtained lithium air battery was estimated, and states of the negative electrode were observed.

Example 13

In Example 13, Example 1 was repeated with the exception that LiBr (0.05M), lithium nitrate (1.0M) and LiTFSI (1.0M) were dissolved as the lithium salt in the organic solvent to prepare a non-aqueous electrolyte that was then used to produce a lithium air battery. The cycle performance of the obtained lithium air battery was estimated, and states of the negative electrode were observed.

Example 14

In Example 14, Example 1 was repeated with the exception that LiBr (0.2M), lithium nitrate (0.5M) and LiTFSI (0.5M) were dissolved as the lithium salt in the organic solvent to prepare a non-aqueous electrolyte that was then used to produce a lithium air battery. The cycle performance of the obtained lithium air battery was estimated, and states of the negative electrode were observed.

The experimental conditions for Examples and Comparative Examples 1 through 14 are tabulated in Table 1.

TABLE 1

Listing of the Experimental Conditions for Examples and
Comparative Examples 1 through 14 (M stands for mol/L)

| Ex./Comp. Ex. | Concentration of LiX (M) | Concentration of LiNO$_3$ (M) | Concentration of additional lithium salts (M) | LiX/LiNO$_3$ molar ratio |
|---|---|---|---|---|
| Ex. 1 | 0.05 (X = Br) | 1.0 | — | 0.05 |
| Ex. 2 | 0.05 (X = Br) | 0.5 | — | 0.1 |
| Ex. 3 | 0.05 (X = Br) | 0.3 | — | 0.16 |
| Comp. Ex. 4 | — | — | 1.0 (LiTfO) | — |
| Comp. Ex. 5 | 0.05 (X = Br) | — | 1.0 (LiTfO) | — |
| Comp. Ex. 6 | 0.05 (X = I) | — | 1.0 (LiTfO) | — |
| Comp. Ex. 7 | — | 1.0 | — | — |
| Comp. Ex. 8 | 0.05 (X = Br) | 0.1 | — | 0.5 |
| Ex. 9 | 0.01 (X = Br) | 1.0 | — | 0.01 |
| Ex. 10 | 0.1 (X = Br) | 1.0 | — | 0.1 |
| Ex. 11 | 0.5 (X = Br) | 1.0 | — | 0.5 |
| Ex. 12 | 1.0 (X = Br) | 1.0 | — | 1 |
| Ex. 13 | 0.05 (X = Br) | 1.0 | 1.0 (LiTFSI) | 0.05 |
| Ex. 14 | 0.2 (X = Br) | 0.5 | 0.5 (LiTFSI) | 0.4 |

| Ex./Comp. Ex. | Total Concentration of the lithium salts (M) | Organic solvent |
|---|---|---|
| Ex. 1 | 1.05 | TEGDME |
| Ex. 2 | 0.55 | TEGDME |
| Ex. 3 | 0.35 | TEGDME |
| Comp. Ex. 4 | 1.0 | TEGDME |
| Comp. Ex. 5 | 1.05 | TEGDME |
| Comp. Ex. 6 | 1.05 | TEGDME |
| Comp. Ex. 7 | 1.0 | TEGDME |
| Comp. Ex. 8 | 0.15 | TEGDME |
| Ex. 9 | 1.01 | TEGDME |
| Ex. 10 | 1.1 | TEGDME |
| Ex. 11 | 1.5 | TEGDME |
| Ex. 12 | 2.0 | TEGDME |
| Ex. 13 | 2.05 | TEGDME |
| Ex. 14 | 1.2 | TEGDME |

FIG. 2 is indicative of the charge-discharge cycle performance of the lithium air battery according to Example 1.

FIG. 3 is indicative of the charge-discharge cycle performance of the lithium air battery according to Comparative Example 4.

FIG. 4 is indicative of the charge-discharge cycle performance of the lithium air battery according to Comparative Example 5.

FIG. 5 is indicative of the charge-discharge cycle performance of the lithium air battery according to Comparative Example 6.

From FIG. 2 it has been found that in the lithium air battery of Example 1, there is a constant charge-discharge cycle performance obtained without inducing any increase in the voltage of the air electrode during charging. From FIGS. 3, 4 and 5, on the other hand, it has been found that in the lithium air batteries of Comparative Examples 4, 5 and 6, the voltage of the air electrode during charging increases with increasing cycles. Note here that although not shown, the charge-discharge cycle performance of the lithium air batteries according to Examples 2, 3 and 9 to 14 showed a tendency similar to that of the lithium air battery according to Example 1.

FIG. 6 is indicative of changes in the amount of oxygen generated out of the lithium air battery according to Example 1 during charging.

FIG. 7 is indicative of changes in the amount of oxygen generated out of the lithium air battery according to Comparative Example 4 during charging.

FIG. 8 is indicative of changes in the amount of oxygen generated out of the lithium air battery according to Comparative Example 5 during charging.

FIG. 9 is indicative of changes in the amount of oxygen generated out of the lithium air battery according to Comparative Example 6 during charging.

FIG. 10 is indicative of changes in the amount of oxygen generated out of the lithium air battery according to Comparative Example 7 during charging.

The theoretical value ($O_2/e=0.5$) for the amount of oxygen generated, shown in FIGS. 6 to 10, is correspond to the upper frame lines of the figures. According to FIG. 6, it has been found that in the lithium air battery according to Example 1, the amount of oxygen generated during charging remains constant although it does not reach the theoretical value. According to FIGS. 7 to 10, on the other hand, it has been found that throughout the lithium air batteries according to Comparative Examples 4 to 7, the amount of oxygen generated during charging is smaller than that of Example 1 and remains inconsistent, indicating that a part of the oxygen to be generated during charging is used for decomposition or the like of the non-aqueous electrolyte. Note here that although not shown, the behavior of the amount of oxygen generated out of each of the lithium air batteries according to Examples 2, 3 and 9 to 14 during charging did also show a tendency similar to that of Example 1.

To what degree the non-aqueous electrolyte was broken down after 20 cycles was analyzed. As a result, it has been found that in the lithium air battery according to Example 1, the amount of decomposition of the non-aqueous electrolyte is a scant 0.9% whereas in the lithium air battery according to Comparative Example 4, it is as high as 11.5%.

From these results, it has been shown that if the non-aqueous electrolyte for lithium air batteries contains as the lithium salt LiX (where X stands for Br and/or I) and lithium nitrate at the same time, it is then possible to achieve a lowering of positive electrode overvoltage and hold back decomposition of the electrolyte.

FIG. 11 is an SEM image taken of a post charge-discharge state of the negative electrode of the lithium air battery according to Example 1.

FIG. 12 is an SEM image taken of a post charge-discharge state of the negative electrode of the lithium air battery according to Comparative Example 4.

FIG. 13 is an SEM image taken of a post charge-discharge state of the negative electrode of the lithium air battery according to Comparative Example 7.

In FIGS. 11, 12 and 13, (A), (B) and (C) are indicative of a post-discharge state of the surface of the negative electrode having a dissolution loss of 10 μm, a post-charge state of the surface of the negative electrode having a 10 μm deposition and a state of the section of the negative electrode after 20 charge-discharge cycles, respectively.

Figure 11A:
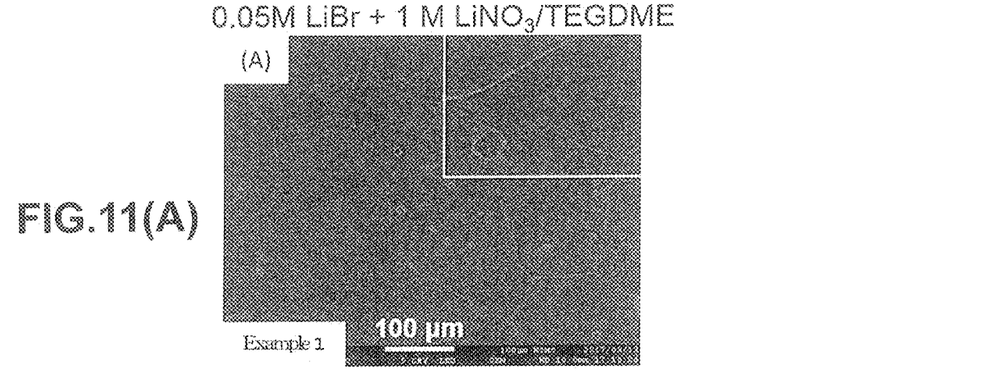
FIGS. 11(A), 11(B) and 11(C) are SEM images taken of a post charge-discharge state of the negative electrode of the lithium air battery according to Example 1.
Figure 11B:
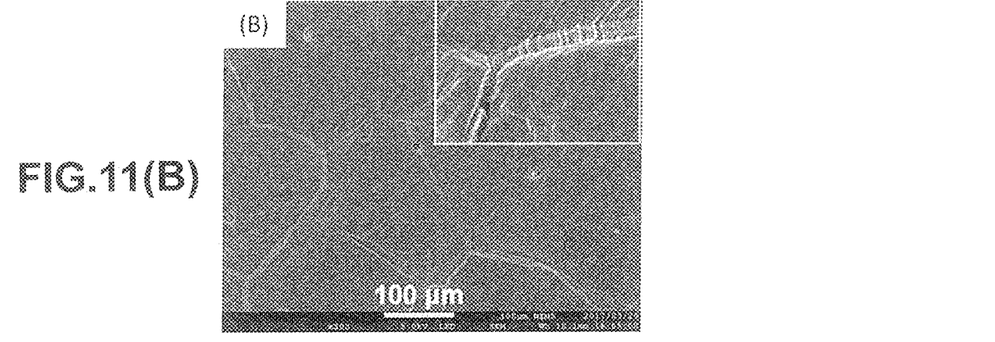
Figure 11C:
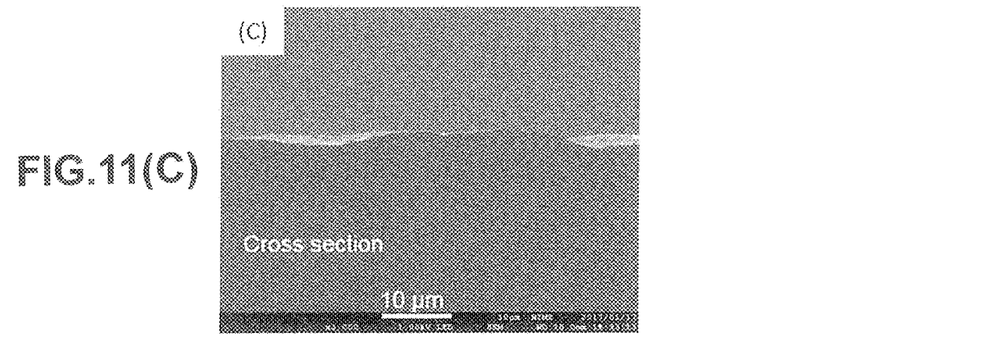

According to FIGS. 11(A), 11(B) and 11(C), it has been identified that the negative electrode of the lithium air battery according to Example 1 has a very smooth surface either after discharging or after charging, and this smooth surface is kept intact even after 20 charge-discharge cycles. It has also been identified by depth analysis using an X-ray photoelectric spectrometer (VersaProbe II made by ULVAC-PHI, INCORPORATED) that the surface of the negative electrode is protected with a very thin oxide film ($Li_2O$) having a thickness on the order of several tens nm or lower. Note here that although not shown, the negative electrodes of the lithium air batteries according to Examples 2, 3 and 9 to 14 have showed a tendency similar to that of Example 1.

Figure 12A:
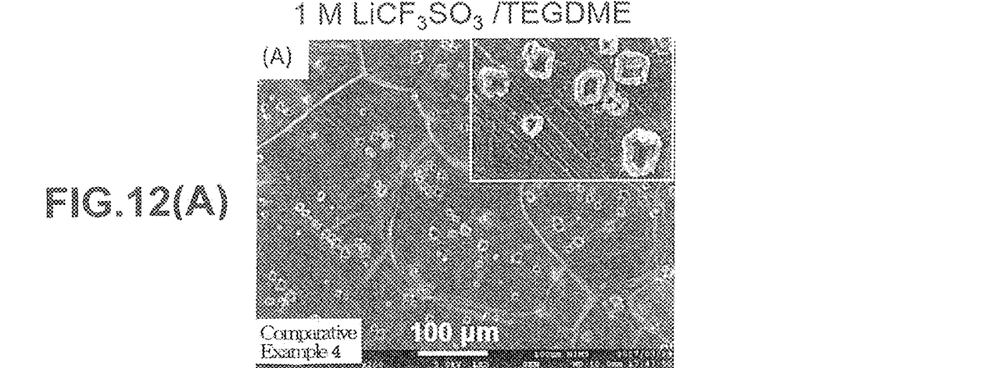
FIGS. 12(A), 12(B) and 12(C) are SEM images taken of a post charge-discharge state of the negative electrode of the lithium air battery according to Comparative Example 4.
Figure 12B:
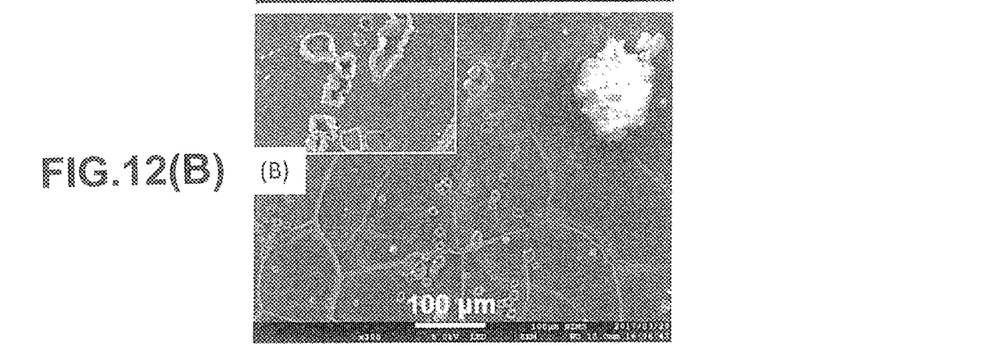
Figure 12C:
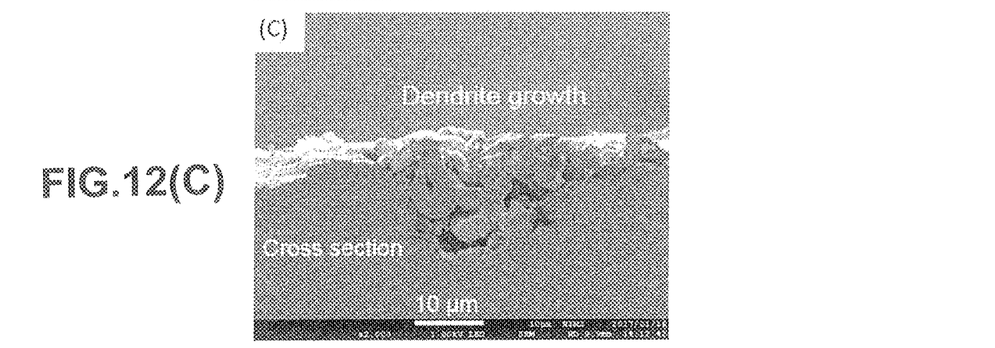

According to FIGS. 12(A), 12(B) and 12(C), on the other hand, it has been identified that the lithium air battery according to Comparative Example 4 has a number of particulate matters on the surface both after discharging and after charging, and upon 20 charge-discharge cycles, dendrite grows. According to FIGS. 13(A), 13(B) and 13(C), it has been identified that the negative electrode of the lithium air battery according to Comparative Example 7 has a few crater-like holes both after discharging and after charging, and after 20 charge-discharge cycles, there is a large indent or recess formed although there is no dendrite growth.

From these results, it has been shown that the non-aqueous electrolyte for lithium air batteries fails to provide good enough protection of the lithium metal-containing negative electrode with the single use of lithium nitrate, and that simultaneous incorporation as the lithium salt of LiX (where X stands for Br and/or I) and lithium nitrate ensures that the negative electrode is always covered with an oxide film having a constant thinness (of several tens nm or lower) thereby holding back abnormal growth such as dendrite growth.

From the foregoing, it has been found that the inventive non-aqueous electrolyte for lithium air batteries should contain as the lithium salt LiX (where X stands for Br and/or I) and lithium nitrate at the same time for the purpose of achieving a lowering of positive electrode overvoltage, holding back decomposition of the electrolyte and corrosion of the air electrode, and constantly covering the negative electrode with an oxide film having a constant thinness thereby holding back abnormal growth such as dendrite growth. If such a non-aqueous electrolyte is used for a lithium air battery, a thin oxide film (on the order of several tens nm or lower) does not only ensures that electrical resistance is kept so low that the reaction of the negative electrode with the non-aqueous electrolyte is held back, but the oxide film also functions as the SEI layer leading to an improvement in the output performance.

INDUSTRIAL APPLICABILITY

The non-aqueous electrolyte of the invention is used for lithium air batteries, lithium metal batteries or the like.

EXPLANATION OF THE REFERENCE NUMERALS

100: Lithium Air Battery
110: Air Electrode
120: Negative Electrode
130: Non-Aqueous Electrolyte
140: Positive Electrode Reaction Layer
150: Positive Electrode Collector
160: Negative Electrode Active Substance Layer
170: Negative Electrode Collector

What is claimed is:

1. A lithium air battery comprising an air electrode, a negative electrode containing a lithium metal, and a non-aqueous electrolyte interposed between the air electrode and the negative electrode, wherein:
the non-aqueous electrolyte contains an organic solvent and a lithium salt,
the lithium salt contains at least LiX (where X stands for Br and/or I) and lithium nitrate, a molar concentration (mol/L) of the LiX in the non-aqueous electrolyte satisfies a range of no less than 0.005 to no greater than 2.0, and
a molar concentration (mol/L) of the lithium nitrate in the non-aqueous electrolyte satisfies a range of greater than 0.1 to no greater than 2.0.

2. The lithium air battery according to claim 1, wherein:
the molar concentration (mol/L) of the LiX in the non-aqueous electrolyte satisfies a range of no less than 0.01 to no greater than 1.0, and
the molar concentration (mol/L) of the lithium nitrate in the non-aqueous electrolyte satisfies a range of no less than 0.2 to no greater than 1.0.

3. The lithium air battery according to claim 2, wherein:
the molar concentration (mol/L) of the LiX in the non-aqueous electrolyte satisfies a range of no less than 0.02 to no greater than 0.5, and
the molar concentration (mol/L) of the lithium nitrate in the non-aqueous electrolyte satisfies a range of no less than 0.3 to no greater than 1.0.

4. The lithium air battery according to claim 1, wherein a molar ratio of the LiX with respect to the lithium nitrate (LiX/lithium nitrate) is in a range of no less than 0.01 to no greater than 5.

5. The lithium air battery according to claim 4, wherein the molar ratio of the LiX with respect to the lithium nitrate (LiX/lithium nitrate) is in a range of no less than 0.01 to no greater than 1.

6. The lithium air battery according to claim 5, wherein the molar ratio of the LiX with respect to the lithium nitrate (LiX/lithium nitrate) is in a range of no less than 0.05 to no greater than 0.5.

7. The lithium air battery according to claim 6, wherein the molar ratio of the LiX with respect to the lithium nitrate (LiX/lithium nitrate) is in a range of no less than 0.05 to no greater than 0.2.

8. The lithium air battery according to claim 1, wherein a total molar concentration (mol/L) of the LiX and lithium nitrate in the non-aqueous electrolyte satisfies a range of no less than 0.3 to no greater than 2.0.

9. The lithium air battery according to claim 8, wherein the total molar concentration (mol/L) of the LiX and lithium nitrate in the non-aqueous electrolyte satisfies a range of no less than 0.35 to no greater than 1.05.

10. The lithium air battery according to claim 1, wherein the organic solvent is selected from the group consisting of a glyme, methyl butyl ether, diethyl ether, ethyl butyl ether, dibutyl ether, polyethylene glycol dimethyl ether, tetraethylene glycol dimethyl ether, cyclohexanone, dioxane, dimethoxyethane, 2-methyltetra-hydrofuran, 2,2-dimethyltetrahydrofuran, 2,5-dimethyltetrahydrofuran, tetrahydrofuran, methyl acetate, ethyl acetate, n-propyl acetate, dimethyl acetate, methyl propionate, ethyl propionate, methyl formate, ethyl formate, dimethyl carbonate, diethyl carbonate, ethyl methyl carbonate, dipropyl carbonate, methyl propyl carbonate, ethyl propyl carbonate, ethylene carbonate, propylene carbonate, butylene carbonate, polyethylene carbonate, γ-butyrolactone, decanolide, valerolactone, mevalonolactone, caprolactone, acetonitrile, benzonitrile, nitromethane, nitrobenzene, triethylamine, triphenylamine, tetraethylene glycol diamine, dimethylformamide, diethylformamide, N-methylpyrrolidone, dimethyl sulfone, tetramethylene sulfone, triethylphosphine oxide, 1,3-dioxolane and sulfolane.

11. The lithium air battery according to claim 10, wherein the glyme is selected from the group consisting of monoglyme, diglyme, triglyme and tetraglyme.

12. The lithium air battery according to claim 1, wherein the non-aqueous electrolyte further contains a lithium salt selected from the group consisting of $LiPF_6$, $LiBF_4$, $LiSbF_6$, $LiSiF_6$, $LiAsF_6$, $LiN(SO_2C_2F_5)_2$, $Li(FSO_2)_2N$, $Li(CF_3SO_2)_2N$, $LiCF_3SO_3$, $LiC_4F_9SO_3$, $LiClO_4$, $LiAlO_2$, $LiAlCl_4$ and $LiB(C_2O_4)_2$.

13. The lithium air battery according to claim 12, wherein a total molar concentration (mol/L) of the LiX, the lithium nitrate and the aforesaid further lithium salt in the non-aqueous electrolyte satisfies a range of no less than 0.35 to no greater than 3.0.

14. The lithium air battery according to claim 13, wherein the total molar concentration (mol/L) of the LiX, the lithium nitrate and the aforesaid further lithium salt in the non-aqueous electrolyte satisfies a range of no less than 1.0 to no greater than 2.1.

15. The lithium air battery according to claim 1, wherein the negative electrode includes an active layer having a surface covered with $Li_2O$ layer to prevent increase in an electrical resistance.

* * * * *